(12) United States Patent
Edvardsson (10) Patent No.: US 8,970,424 B2
(45) Date of Patent: Mar. 3, 2015

(54) RADAR LEVEL GAUGE SYSTEM WITH REDUCED ANTENNA REFLECTION

(71) Applicant: Rosemount Tank Radar AB, Gothenburg (SE)

(72) Inventor: Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 233 days.

(21) Appl. No.: 13/659,021

(22) Filed: Oct. 24, 2012

(65) Prior Publication Data

US 2014/0111371 A1    Apr. 24, 2014

(51) Int. Cl.
  *G01F 23/284* (2006.01)
  *G01S 13/08* (2006.01)
  *G01S 7/02* (2006.01)
  (Continued)

(52) U.S. Cl.
  CPC .................................. *G01F 23/284* (2013.01)
  USPC ........... 342/124; 342/118; 342/175; 342/188; 343/700 R; 343/756; 343/772

(58) Field of Classification Search
  CPC ....... G01F 23/22; G01F 23/28; G01F 23/284; G01S 13/02; G01S 13/06; G01S 13/08; G01S 13/88
  USPC ........... 342/118, 124, 175, 188, 361–366, 82, 342/89, 159; 343/772–786, 700 R, 756; 73/290 R, 290 V; 324/600, 629, 637, 324/638
  See application file for complete search history.

(56) References Cited

U.S. PATENT DOCUMENTS 4,298,876 A * 11/1981 Crochet ........................ 343/756
4,707,702 A * 11/1987 Withers ........................ 343/756
5,543,720 A    8/1996 Edvardsson
(Continued)

FOREIGN PATENT DOCUMENTS

DE    102011075636 A1    11/2012
GB         962601 A     7/1964
(Continued)

OTHER PUBLICATIONS

Notification of Transmittal of the International Search Report and the Written Opinion of the International Searching Authority, or the Declaration dated Mar. 7, 2014 in related International Application No. PCT/SE2013/000153, filed Oct. 2, 2013. 10 pgs.

*Primary Examiner* — Bernarr Gregory
(74) *Attorney, Agent, or Firm* — Westman, Champlin Koehler, P.A.

(57) ABSTRACT

A radar level gauge system for determining a filling level in a tank. The radar level gauge system comprises a transceiver, a horn antenna having a first opening connected to the transceiver and a second opening facing a surface of the product in the tank, and processing circuitry connected to the transceiver for determining the filling level based on an electromagnetic surface reflection signal. The horn antenna is configured in such a way that an electrical distance from the first opening to the second opening, along a path defined by an intersection between a wall of the horn antenna and a half-plane starting from and extending in parallel with a cone axis of the horn antenna, is different for different orientations of the half-plane with respect to the cone axis. Hereby, disturbance from an antenna reflection signal can be reduced, which provides for improved measurement of high filling levels.

15 Claims, 5 Drawing Sheets

(51) Int. Cl.
*G01F 23/00* (2006.01)
*G01S 13/00* (2006.01)

(56) References Cited

U.S. PATENT DOCUMENTS

| | | | |
|---|---|---|---|
| 5,594,449 A * | 1/1997 | Otto | 342/124 |
| 6,401,532 B2 * | 6/2002 | Lubbers | 73/290 R |
| 6,469,676 B1 * | 10/2002 | Fehrenbach et al. | 343/786 |
| 6,661,389 B2 * | 12/2003 | Griessbaum et al. | 343/786 |
| 6,759,976 B1 * | 7/2004 | Edvardsson | 342/124 |
| 6,759,977 B1 * | 7/2004 | Edvardsson et al. | 342/124 |
| 6,987,481 B2 * | 1/2006 | Fehrenbach et al. | 342/124 |
| 7,002,528 B2 * | 2/2006 | Moheb | 343/786 |
| 7,106,247 B2 * | 9/2006 | Edvardsson | 342/124 |
| 7,239,267 B2 * | 7/2007 | Edvardsson | 342/124 |
| 7,265,558 B1 * | 9/2007 | Penndal et al. | 342/124 |
| 7,623,064 B2 * | 11/2009 | Calderbank et al. | 342/188 |
| 7,640,799 B2 * | 1/2010 | Griessbaum et al. | 73/290 V |

FOREIGN PATENT DOCUMENTS

| | | |
|---|---|---|
| WO | 2005109575 A1 | 11/2005 |
| WO | WO 2005109575 A1 | 11/2005 |

* cited by examiner

RADAR LEVEL GAUGE SYSTEM WITH REDUCED ANTENNA REFLECTION

TECHNICAL FIELD OF THE INVENTION

The present invention relates to a radar level gauge system comprising a horn antenna.

TECHNICAL BACKGROUND

Radar level gauge systems for measuring the filling level of a product contained in a tank are well-known. A radar level gauge system generally comprises a transmitter for transmitting an electromagnetic signal towards the surface of the product, a receiver for receiving the electromagnetic signal reflected at the surface of the product, and a signal processing device for determining the level of the product in the tank based on the time-of-flight of the transmitted and reflected electromagnetic signal.

Two main types of radar level gauge (RLG) systems are free radiating RLG systems and so-called guided wave radar (GWR) systems. A free radiating RLG system uses a radiating antenna for directing the transmitted electromagnetic signal towards the surface, and a GWR uses a transmission line wave guide that extends into the product in the tank, typically all the way to the bottom of the tank.

Free radiating RLG systems may use different kinds of antennas for directing the electromagnetic transmission signal towards the surface of the product in the tank. One type of antenna that is often advantageous to use for tank gauging is a horn antenna, which flares out from an entrance opening to an exit opening. When a horn antenna is used, the transmission signal may be fed from the transmitter to the antenna using a hollow waveguide, and the cone antenna functions to provide a smooth transition from propagation in the hollow waveguide to free space propagation below the horn antenna.

Due to, for example, restrictions in the possible dimensions of the horn antenna, there may often remain an impedance transition resulting in reflection of the transmitted electromagnetic signal at the exit opening of the horn antenna.

When the filling level in the tank is in proximity of the exit opening of the horn antenna it may therefore be difficult to determine the filling level due to difficulties in resolving the surface echo signal resulting from reflection of the transmitted electromagnetic signal at the surface of the product in the tank.

According to one approach for minimizing or removing undesired reflections in the horn antenna, WO 2005/109575 discloses a horn antenna that includes an inhomogeneity inside the horn at such a distance from the exit opening of the horn antenna that microwaves reflected by the inhomogeneity and microwaves reflected by the horn edge at the exit opening are canceled out through destructive interference.

Although apparently reducing the reflection at the exit opening of the horn antenna, the approach of WO 2005/109575 would appear to result in an increased loss of signal in the antenna, and a resulting reduction in the maximum measuring distance and/or measurement accuracy of the RLG system.

SUMMARY

In view of the above, a general object of the present invention is to provide for an improved radar level gauge system.

According to a first aspect of the present invention, it is therefore provided a radar level gauge system for determining a filling level of a product in a tank, said radar level gauge system comprising: a transceiver configured to generate and transmit electromagnetic signals having a first polarization and to receive electromagnetic signals having a second polarization different from the first polarization; a horn antenna for directing an electromagnetic transmit signal transmitted by said transceiver towards said surface of the product, and for returning back to said transceiver an electromagnetic surface reflection signal resulting from reflection of said electromagnetic transmit signal at said surface; and processing circuitry connected to said transceiver for determining said filling level based on said electromagnetic surface reflection signal, wherein said horn antenna comprises: a first opening coupled to said transceiver; a second opening, larger than said first opening, directed towards said surface of said product in the tank; and a conductive horn antenna wall connecting said first opening and said second opening to form a horn structure having a central longitudinal axis, wherein said conductive horn antenna wall exhibits: a first electrical distance from said first opening to said second opening, along a first path defined by an intersection between said conductive horn antenna wall and a half-plane extending from said central longitudinal axis at a first rotational orientation in respect of said central longitudinal axis; and a second electrical distance from said first opening to said second opening, along a second path defined by an intersection between said conductive horn antenna wall and a half-plane extending from said central longitudinal axis at a second rotational orientation in respect of said central longitudinal axis, said second electrical distance being different from said first electrical distance, and wherein a difference between said first electrical distance and said second electrical distance is such that an antenna reflection signal resulting from reflection of said electromagnetic transmit signal by said horn antenna has a polarization being different from said second polarization.

The antenna reflection signal may result from reflection of the electromagnetic transmit signal at the second opening of the horn antenna.

For cone shaped horn antennas, the central longitudinal axis is the cone axis of the conductive horn antenna wall. This is the most common case.

It should be understood that the conductive horn antenna wall need not be conductive everywhere, but that there may be dielectric portions in the conductive horn antenna wall between the first opening and the second opening. Such dielectric portions may be one or several apertures and/or solid dielectric material. Dielectric portion(s) will affect the electrical distance along a path passing through one or several such dielectric portions.

The polarization of an electromagnetic signal (an electromagnetic plane wave) may be linear, circular or elliptical. Different polarizations may, for example, be different linear polarizations (vertical and horizontal), different circular polarizations (right-hand and left hand) etc.

Different polarization states may be used to separate transmitted electromagnetic signals from received electromagnetic signals at the receiver. If, for example, an electromagnetic transmit signal having a first circular polarization (such as left-hand) hits a smooth surface, the electromagnetic reflection signal resulting from reflection of the electromagnetic transmit signal at the surface will have the opposite circular polarization (right-hand). By providing for, in this example, that the transceiver only receives right-hand polarized electromagnetic signals, good signal isolation between transmitted and received electromagnetic signals can be achieved. This signal insulation may be very useful to improve sensitivity of the radar level gauge system. This is especially the case for so-called FMCW (frequency modulated continuous wave) systems, as signal leakage from transmitter to receiver combined with delay in the transmission to the antenna limits system sensitivity. Accordingly, the transceiver may advantageously be configured to only receive signals having the second polarization.

According to another example, an electromagnetic transmit signal having a first linear polarization (such as horizontal) may be propagated towards a rough surface. The electromagnetic reflection signal resulting from reflection of the electromagnetic transmit signal at such a surface may be substantially depolarized. In other words, the electromagnetic reflection signal may be seen as a superposition of a first partial signal having the first linear polarization and a second partial signal having a second linear polarization orthogonal to the first linear polarization. This means that the second partial signal (having the second linear polarization, such as vertical) may be received, whereby good signal isolation between transmitted and received electromagnetic signals can be achieved.

The present invention is based on the realization that the difference in polarization between transmitted and received electromagnetic signals exemplified above can be used to remove or disregard also a reflection caused by the horn antenna provided that the horn antenna is configured such that the electromagnetic signal reflected by the antenna has a polarization that is different from the polarization that is received by the transceiver.

By eliminating or at least significantly reducing the antenna reflection signal in this manner, reliable measurements of high filling level can be performed, possibly even for such a high filling level that the surface of the product in the tank is inside the horn antenna.

To provide for particularly convenient distinction between the surface reflection signal and the antenna reflection signal, the horn antenna may be configured in such a way that the antenna reflection signal has the first polarization, that is, the same polarization as the electromagnetic transmit signal. In such embodiments, existing transceiver solutions may be used practically without modification and still provide for efficient removal/blocking of the antenna reflection signal.

To simplify the separation between electromagnetic signals having the first polarization and electromagnetic signals having the second polarization, the first and second polarizations may advantageously be orthogonal polarizations, such as circular polarizations or linear polarizations.

For a conventional horn antenna, an antenna reflection signal resulting from reflection at the second opening, also referred to as the antenna rim, will have the same polarization as a signal reflected at a smooth surface. In other words, if the electromagnetic transmit signal has a first circular polarization (such as left-handed), the antenna reflection signal will have a second circular polarization different from the first circular polarization (such as right-handed). This means that the antenna reflection signal may not be easily distinguishable from a surface reflection signal, in particular when the surface is close to the second opening of the antenna.

By configuring the horn antenna such that the antenna reflection signal resulting from reflection of the electromagnetic transmit signal at the second opening of the horn antenna (the antenna rim) has the same circular polarization as the electromagnetic transmit signal, the antenna reflection signal can easily be eliminated or at least easily distinguished. In particular, the antenna reflection signal can easily be directed away from the receiver input. Furthermore, the separation between the antenna reflection signal and the surface reflection signal also facilitates analysis of the antenna reflection signal, which may give useful information regarding, for example, possible antenna contamination.

The present inventor has realized that the desired polarization of the antenna reflection signal can be achieved by configuring the horn antenna such that an electrical distance from the first opening to the second opening, along a path defined by an intersection between a wall of the horn antenna and a half-plane starting from and extending in parallel with a cone axis of the horn antenna, is different for different orientations of the half-plane with respect to the cone axis.

In the context of the present application, the term "electrical distance" should be understood as the distance, in terms of wavelengths, experienced by a particular electromagnetic signal. Depending, for example, on the propagation properties of different materials, propagation of a given electromagnetic signal through or along the same physical distance through the different materials may take different times. This physical distance through the different materials will then correspond to different electrical distances.

In particular for cases when the electromagnetic transmit signal is elliptically (or circularly) polarized, the polarization of the antenna reflection signal can be influenced by providing a horn antenna having a varying electrical distance from the first opening to the second opening.

In particular, since any elliptically or circularly polarized electromagnetic signal can be seen as a superposition of two linearly polarized signals with mutually orthogonal/perpendicular polarization directions, the electrical distance may advantageously be substantially the same along any two of the paths located opposite each other with respect to the cone axis. Accordingly, the conductive horn antenna wall may further exhibit the first electrical distance from the first opening to the second opening, along a third path defined by an intersection between the conductive horn antenna wall and a half-plane extending from the central longitudinal axis, the third path being located opposite the first path with respect to the central longitudinal axis; and the second electrical distance from the first opening to the second opening, along a fourth path defined by an intersection between the conductive horn antenna wall and a half-plane extending from the central longitudinal axis, the fourth path being located opposite the second path with respect to the central longitudinal axis.

Moreover, the electrical distance as a function of a rotational orientation of the half-plane with respect to the central longitudinal axis (typically the same as the cone axis) may exhibit a first maximum and a second maximum located opposite each other with respect to the central longitudinal axis; and a first minimum and a second minimum located opposite each other with respect to the central longitudinal axis.

The first minimum may be located half-way between the first maximum and the second maximum, in terms of rotation around the central longitudinal axis, so that, for example, a horizontal linearly polarized signal will experience a minimum electrical distance to the antenna rim and a vertical linearly polarized signal will experience a maximum electrical distance to the antenna rim.

Turning again to the example of the electromagnetic transmit signal having a first circular polarization (for example left-hand), the same electrical distance to the antenna rim for two perpendicular/orthogonal linear polarization components will result in a shift in polarization to the second circular polarization (for example left-hand) upon reflection at the second opening (antenna rim).

With a suitable difference in electrical distance, such as a quarter of the (center) wavelength of the electromagnetic transmit signal, a 180° phase shift of one of the linear polarization components will be introduced, whereby the antenna reflection signal will instead have the first circular polarization, so that the antenna reflection signal can conveniently be excluded from reception at the transceiver.

Accordingly, in various embodiments of the radar level gauge system of the present invention, the electrical distance for said first maximum may be substantially the same as the electrical distance for said second maximum; the electrical distance for said first minimum may be substantially the same as the electrical distance for said second minimum; and a difference in electrical distance for said first maximum and said first minimum may be a quarter of a (center) wavelength of said electromagnetic transmit signal. As an example, the quarter of a wavelength at 25 GHz is 3 mm, which is a small mechanical change for a horn antenna with a second opening (exit opening) having an exemplary diameter of about 50 mm to 100 mm.

According to various embodiments of the radar level gauge system of the present invention, the above-mentioned difference in electrical distance may advantageously be achieved by configuring the horn antenna such that a physical length of the path is different for different orientations of the half-plane with respect to the central longitudinal axis.

Such a different physical length may, for example, be achieved by providing cut-outs at positions along the second opening (the antenna rim) located opposite each other with respect to the central longitudinal axis of the horn antenna. The cut-outs may result in a stepped profile of the second opening, or the variation of physical length may be smooth. For instance, the length of the above-mentioned path from the first opening to the second opening may vary substantially sinusoidally along the second opening of the horn antenna (antenna rim).

As an alternative or complement to varying the physical length of the above-mentioned path from the first opening to the second opening of the horn antenna, the difference in electrical length can be achieved through a suitable combination of materials along the path. For instance, one or several apertures may be provided in the wall of the horn antenna and/or the horn antenna may be provided with dielectric material at selected locations intended to locally reduce the propagation speed of the electromagnetic transmit signal, which is equivalent to locally increasing the electrical distance from the first opening to the second opening of the horn antenna.

In the case of one or several apertures used for modifying the electrical distance between the first opening and the second opening of the horn antenna, such aperture(s) may be approximately one half of a center wavelength of the electromagnetic transmit signal.

According to various embodiments, furthermore, the horn antenna may comprise a first aperture arranged at a first angular position in relation to the central longitudinal axis of the horn antenna and a second aperture arranged at a second angular position, spaced apart from the first angular position by approximately 180°.

According to a second aspect of the present invention, there is provided a method of determining a filling level of a product in a tank, comprising the steps of: transmitting an electromagnetic transmit signal having a first polarization; propagating, using a horn antenna, the electromagnetic transmit signal towards the surface of the product; reflecting, by the horn antenna, a portion of the electromagnetic transmit signal as an antenna reflection signal having the first polarization; receiving an electromagnetic surface reflection signal resulting from reflection of the electromagnetic transmit signal at the surface of the product, the electromagnetic reflection signal having a second polarization different from the first polarization; and determining the filling level based on the electromagnetic surface reflection signal.

The first and second polarizations may advantageously be circular polarizations.

Further embodiments of, and effects obtained through this second aspect of the present invention are largely analogous to those described above for the first aspect of the invention.

In summary, the present invention thus relates to a radar level gauge system for determining a filling level in a tank. The radar level gauge system comprises a transceiver, a horn antenna having a first opening connected to the transceiver and a second opening facing a surface of the product in the tank, and processing circuitry connected to the transceiver for determining the filling level based on an electromagnetic surface reflection signal. The horn antenna is configured in such a way that an electrical distance from the first opening to the second opening, along a path defined by an intersection between a wall of the horn antenna and a half-plane starting from and extending in parallel with a cone axis of the horn antenna, is different for different orientations of the half-plane with respect to the cone axis. Hereby, disturbance from an antenna reflection signal can be reduced, which provides for improved measurement of high filling levels.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS

In the present detailed description, various embodiments of the present invention are mainly discussed with reference to a radar level gauge system comprising a horn antenna having a pair of recesses formed at the second opening (antenna rim) thereof. Furthermore, the use of circularly polarized electromagnetic microwave signals is described.

It should be noted that this by no means limits the scope of the present invention, which also covers radar level gauge systems with other horn antenna configurations capable of achieving the desired polarization of the antenna reflection signal. Moreover, other types of polarization are also feasible. For example, the transceiver may be configured to transmit electromagnetic signals in a first linear or elliptical polarization state and receive electromagnetic signals in a second linear or elliptical polarization state, different from the first linear or elliptical polarization state.

Figure 1:
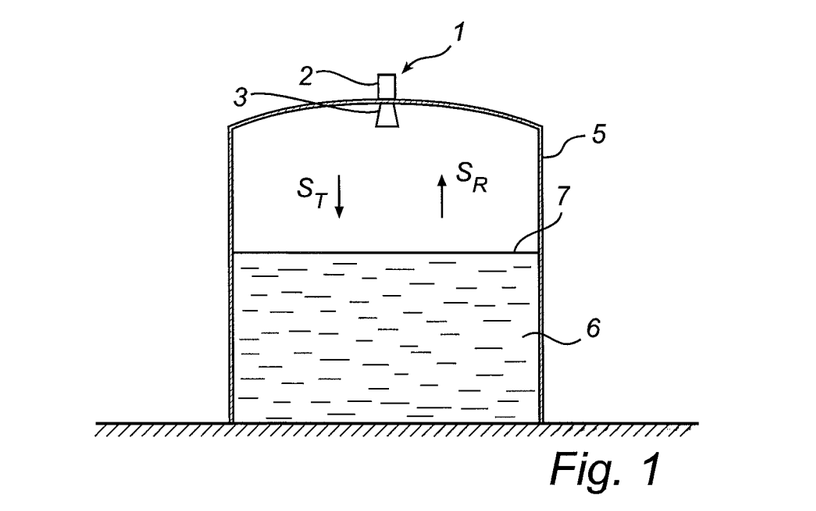
FIG. 1 schematically illustrates a radar level gauge system according to an embodiment of the present invention arranged to measure the filling level in an exemplary tank.

FIG. 1 schematically illustrates a radar level gauge system 1 comprising a measurement unit 2 and a horn antenna 3. The radar level gauge system 1 is arranged on top of a tank 5 for determining the filling level of a product 6 in the tank 5.

When measuring the filling level of the product 6 contained in the tank 5, the radar level gauge system 1 transmits an electromagnetic transmit signal $S_T$ by the horn antenna 3 towards the surface 7 of the product 3, where the signal is reflected as an electromagnetic surface reflection signal $S_R$. The distance between a reference position at the top of the tank 5 and the surface 7 of the product 6 is then determined based on the difference in time-of-flight of the electromagnetic surface reflection signal $S_R$ (from the radar level gauge system 1 to the surface 7 and back) and an electromagnetic signal reflected from the reference position at the top of the tank. From the time between receipt of the surface reflection signal and receipt of the signal reflected at the reference position, the distance to the surface, generally referred to as ullage, can be determined. Based on this distance (the ullage) and known dimensions of the tank 5, the filling level can be deduced.

Figure 2:
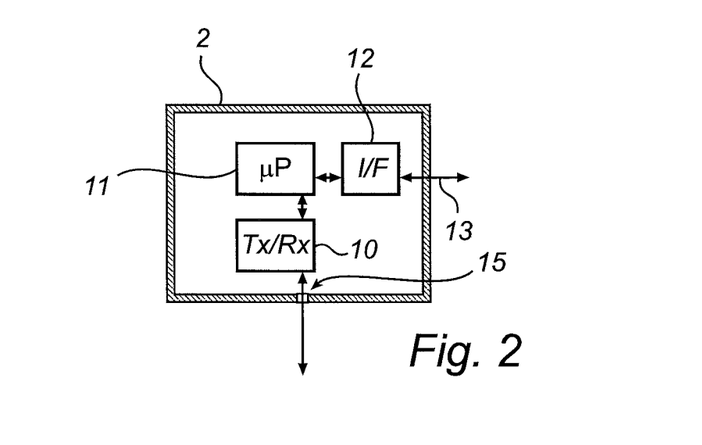
FIG. 2 is a schematic block diagram of the measurement unit comprised in the radar level gauge system in FIG. 1.

Referring to the schematic block diagram in FIG. 2, the measurement unit 2 of the radar level gauge system 1 in FIG. 1 comprises a transceiver 10, processing circuitry, here in the form of a microprocessor 11, an interface 12, communication/power supply lines 13 and a tank feed-through 15.

As is schematically illustrated in FIG. 2, the microprocessor 11 controls the transceiver 10 to generate, transmit and receive electromagnetic signals. The transmitted signals pass through the tank feed-through 15 to the horn antenna 3 (not shown in FIG. 2), and the received signals pass from the horn antenna 3 through the tank feed-through 15 to the transceiver 10.

As was briefly described above with reference to FIG. 1, the microprocessor 11 determines the filling level of the product 6 in the tank 5 based on surface reflection signal $S_R$ received by the transceiver. The filling level is provided to an external device, such as a control center from the microprocessor 11 via the interface circuit 12 through the communication/power supply lines 13.

Although the communication/power supply lines are schematically shown as a single line in FIG. 2, it should be understood that power supply and communication may take place using different lines, and that the radar level gauge system 1 may have a local power store, such as a battery and/or a capacitor or super-capacitor, and that the radar level gauge system 1 may be configured for wireless communication with the external device. In the latter case, the radar level gauge system 1 may advantageously be configured according to the so-called WirelessHART communication protocol (IEC 62591).

The exemplary radar level gauge system 1 in FIG. 1 uses circular polarization to separate transmitted signals from received signals. In particular, the transceiver 10 is configured such that it transmits electromagnetic signals having a first circular polarization, such as right-hand circular polarization—RHP, and receives electromagnetic signals having a second circular polarization orthogonal to the first circular polarization, such as left-hand circular polarization—LHP.

Thus, the electromagnetic transmit signal $S_T$ has the first circular polarization (RHP).

If the surface 7 of the product 6 in the tank 5 is reasonably smooth, the electromagnetic surface reflection signal $S_R$ will then have the second circular polarization (LHP), which means that the electromagnetic surface reflection signal $S_R$ can be received by the transceiver 10.

As was mentioned in the Background section, there will also be a reflection, an electromagnetic antenna reflection signal, at the second opening of the horn antenna 3 (at the antenna rim). As will be discussed further below with reference to FIGS. 4a-b, the antenna reflection signal for a conventional horn antenna will, just like the surface reflection signal $S_R$, have the second circular polarization (LHP) if the transmit signal $S_T$ has the first circular polarization (RHP). For a radar level gauge system using circular polarization to separate transmitted and received signal and comprising a conventional horn antenna, this means that the antenna reflection signal will be received by the transceiver and that it may disturb filling level measurements, especially for high filling levels.

Figure 3:
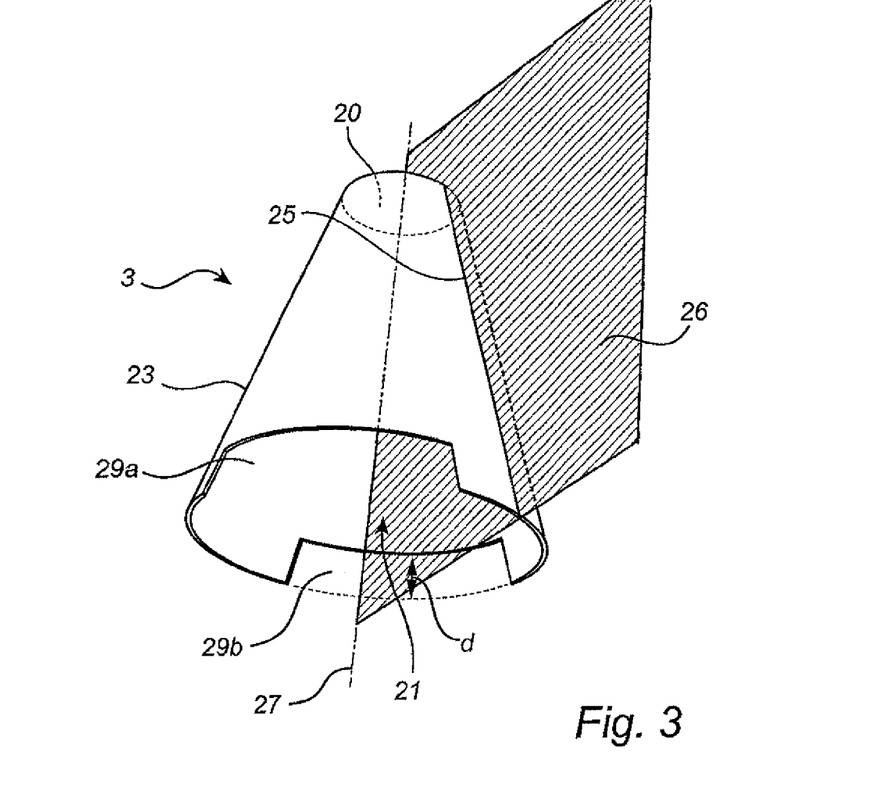
FIG. 3 is an enlarged view of the horn antenna comprised in the radar level gauge system in FIG. 1.

FIG. 3 shows the horn antenna 3 comprised in the radar level gauge system 1 in FIG. 1 in an enlarged view. As can be seen in FIG. 3, the horn antenna 3 comprises a first opening 20, a second opening 21 and an electrically conducting wall 23 extending between the first opening 20 and the second opening 21.

As can be seen in FIG. 3, the horn antenna 3 is configured such that an electrical distance from the first opening 20 to the second opening 21 along a path 25 defined by an intersection between the wall 23 and a half-plane 26 starting from and extending in parallel with the cone axis 27 of the horn antenna 3 is different for different orientations of the half-plane 26 with respect to the cone axis 27.

In particular, the exemplary horn antenna 3 in FIG. 3 has first 29a and second 29b recesses in the wall 23 at the second opening 21 of the horn antenna 3. The first 29a and second 29b recesses are arranged opposite each other with respect to the cone axis 27, and the depth d of each of the recesses 29a-b corresponds to about a quarter of the wavelength of the electromagnetic transmit signal $S_T$.

Since the wall 23 in this exemplary configuration of the horn antenna 3 is uniformly electrically conducting, the electrical distance is proportional to the physical distance along the above-mentioned path 25.

As is also schematically illustrated in FIG. 3, this horn antenna 3 will reflect a portion of the transmitted signal. However, unlike the case for a conventional horn antenna briefly described above, the horn antenna 3 in FIG. 3 will provide an antenna reflection signal $S_{AR}$ that has the same circular polarization as the transmit signal $S_T$, which means that the transceiver 10 will not receive the antenna reflection signal $S_{AR}$, which thus effectively "disappears".

The mechanism behind this behavior will be described below with reference to FIGS. 4a-b which describe the case with a conventional horn antenna, and FIGS. 5a-b which describe the case with the exemplary horn antenna 3 in FIG. 3.

Figure 4A:
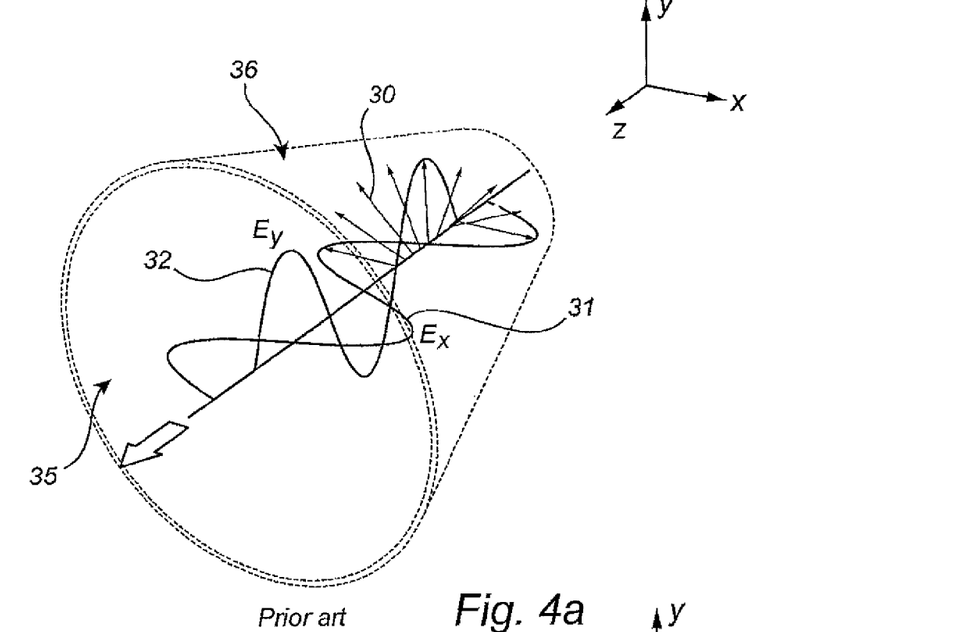
FIGS. 4a-b schematically illustrate the reflection behavior of an electromagnetic signal having circular polarization at an opening of a conventional horn antenna.

FIG. 4a schematically shows a left hand circular polarized (LHP) electromagnetic signal represented by the E-field vector 30 travelling along the z-axis in the direction indicated by the box arrow to the left in the figure. As is shown in FIG. 4a, the LHP electromagnetic signal 30 can be seen as the superposition of a first linearly polarized signal 31 in the x-plane and a second linearly polarized signal 32 in the y-plane. The first linearly polarized signal 31 is π/2 ahead of the second polarized signal 32. When the LHP electromagnetic signal 30 encounters the second opening 35 of the conventional horn antenna 36 schematically indicated in FIG. 4a, the LHP electromagnetic signal 30 is reflected. This is shown in FIG. 4b. The conventional horn antenna 36 is not drawn to scale.

Figure 4B:
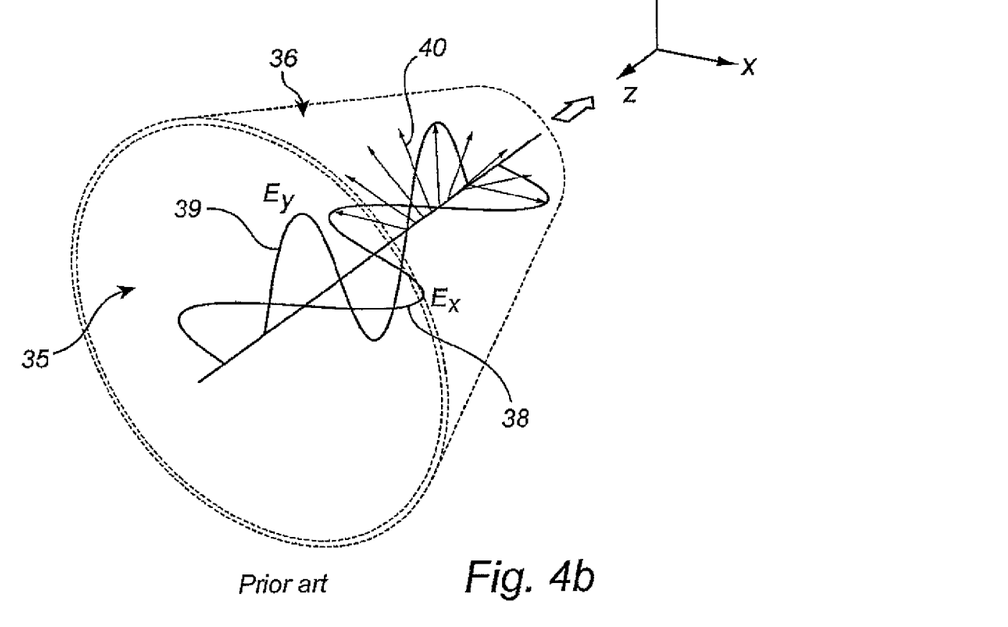

Referring to FIG. 4b, the first reflected linearly polarized signal 38 in the x-plane is π/2 behind the second reflected linearly polarized signal 39 in the y-plane, so that the reflected superposed electromagnetic signal 40 becomes a right-hand circular polarized (RHP) electromagnetic signal. When the reflecting object has a circular symmetry (or suitable 90°-symmetry) this transition between different circular polarizations upon reflection will always occur, which enables the use of different polarizations for transmission and reception.

Figure 5A:
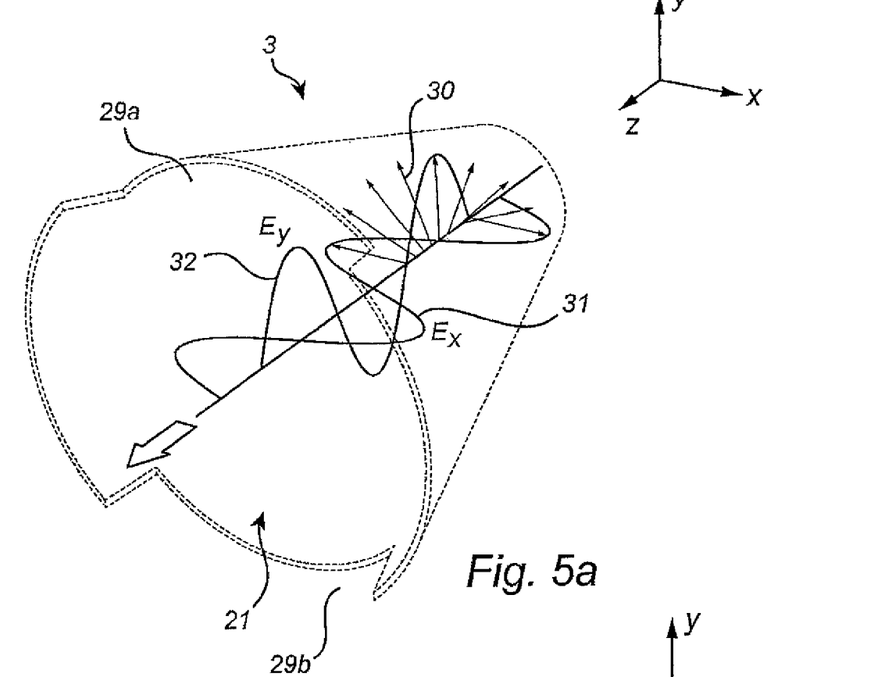
FIGS. 5a-b schematically illustrate the reflection behavior of an electromagnetic signal having circular polarization at an opening of the horn antenna in FIG. 3.
Figure 5B:
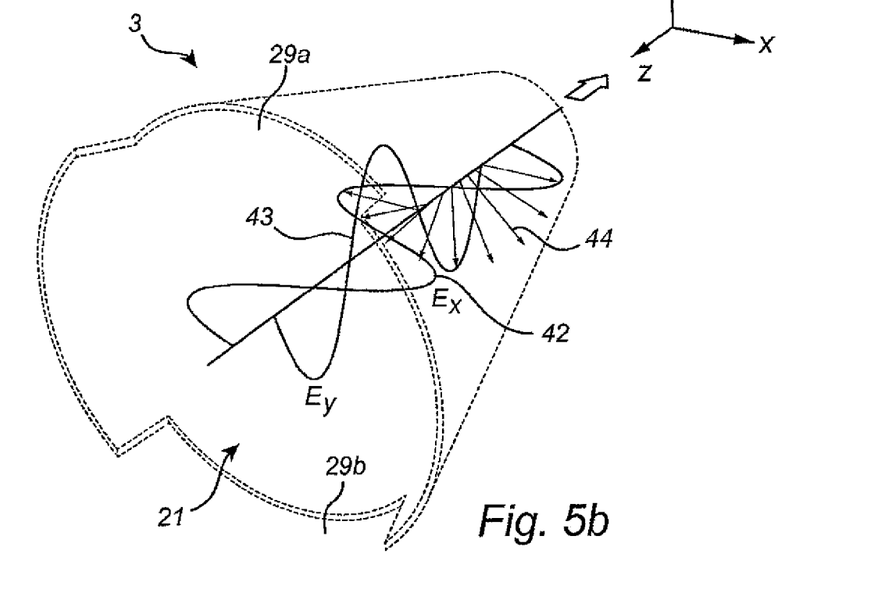

With reference to FIGS. 5a-b the corresponding case for the exemplary horn antenna 3 in FIG. 3 will now be described.

Like FIG. 4a, FIG. 5a schematically shows a left hand circular polarized (LHP) electromagnetic signal represented by the E-field vector 30 travelling along the z-axis in the direction indicated by the box arrow to the left in the figure. As is shown in FIG. 5a, the LHP electromagnetic signal 30 can be seen as the superposition of a first linearly polarized signal 31 in the x-plane and a second linearly polarized signal 32 in the y-plane. The first linearly polarized signal 31 is π/2 ahead of the second polarized signal 32. When the LHP electromagnetic signal 30 encounters the second opening 21 of the inventive horn antenna 3 schematically indicated in FIG. 5a, the LHP electromagnetic signal 30 is reflected. This is shown in FIG. 5b. The horn antenna 3 is not drawn to scale.

As was mentioned above with reference to FIG. 3, each of the recesses 29a-b at the second opening 21 of the horn antenna 3 in FIGS. 5a-b is a quarter of a wavelength deep. Referring to FIGS. 5a-b this means that the first linearly polarized signal 31 will first travel a time period corresponding to a quarter of a wavelength longer than the second linearly polarized signal 32 before it is reflected at the second opening 21, and that the first reflected linearly polarized signal 42 will travel an additional time period corresponding to a quarter of a wavelength before coming to the position along the z-axis where the second reflected linearly polarized signal 43 is generated. During this time (the two time periods), the second linearly polarized signal 32 has also traveled a time period corresponding to a total of a half wavelength.

This means that the first reflected linearly polarized signal 42 in the x-plane is now instead π/2 ahead of the second reflected linearly polarized signal 43 in the y-plane, so that the reflected superposed electromagnetic signal 44 becomes a left-hand circular polarized (LHP) electromagnetic signal, just like the transmitted electromagnetic signal 30.

Figure 6:
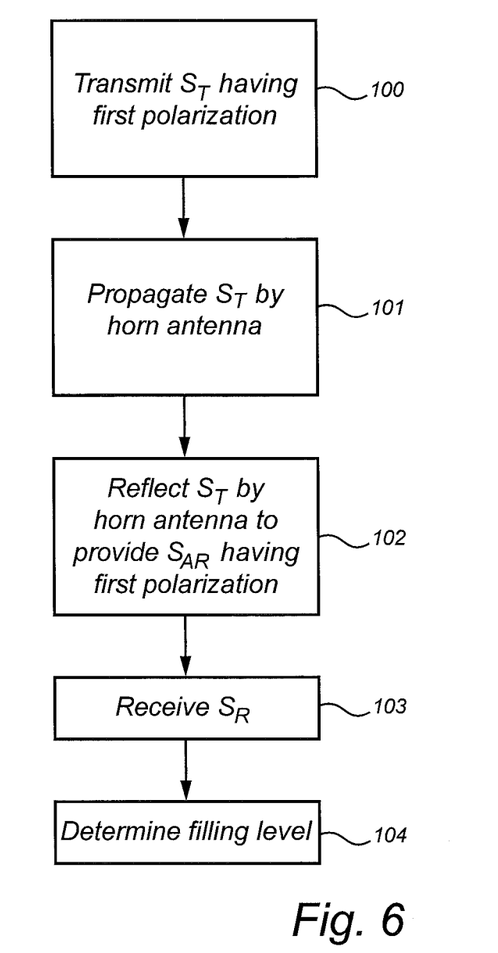
FIG. 6 is a flow-chart outlining a method according to an exemplary embodiment of the present invention.

Finally, an embodiment of the method according to the present invention will now be described with reference to FIGS. 1-3 and the flow-chart in FIG. 6.

In the first step 100, an electromagnetic transmit signal $S_T$ is transmitted. The electromagnetic transmit signal has a first polarization, such as a first circular polarization.

In the next step 101, the electromagnetic transmit signal $S_T$ is propagated towards the surface 7 of the product 6 in the tank 5 using a horn antenna 3.

The horn antenna 3 reflects, in step 102, a portion of the electromagnetic transmit signal $S_T$ as an antenna reflection signal $S_{AR}$ having the first polarization.

An electromagnetic surface reflection signal $S_R$ is resulting from reflection of the electromagnetic transmit signal at the surface 7 is received in step 103.

Finally, in step 104, the filling level is determined based on the electromagnetic surface reflection signal $S_R$.

The person skilled in the art realizes that the present invention by no means is limited to the preferred embodiments described above. On the contrary, many modifications and variations are possible within the scope of the appended claims.

What is claimed is:

1. A radar level gauge system for determining a filling level of a product in a tank, said radar level gauge system comprising:
   a transceiver configured to generate and transmit electromagnetic signals having a first polarization and to receive electromagnetic signals having a second polarization different from the first polarization;
   a horn antenna for directing an electromagnetic transmit signal transmitted by said transceiver towards said surface of the product, and for returning back to said transceiver an electromagnetic surface reflection signal resulting from reflection of said electromagnetic transmit signal at said surface; and
   processing circuitry connected to said transceiver for determining said filling level based on said electromagnetic surface reflection signal,
   wherein said horn antenna comprises:
   a first opening coupled to said transceiver;
   a second opening, larger than said first opening, directed towards said surface of said product in the tank; and
   a conductive horn antenna wall connecting said first opening and said second opening to form a horn structure having a central longitudinal axis,
   wherein said conductive horn antenna wall exhibits:
   a first electrical distance from said first opening to said second opening, along a first path defined by an intersection between said conductive horn antenna wall and a half-plane extending from said central longitudinal axis at a first rotational orientation in respect of said central longitudinal axis; and
   a second electrical distance from said first opening to said second opening, along a second path defined by an intersection between said conductive horn antenna wall and a half-plane extending from said central longitudinal axis at a second rotational orientation in respect of said central longitudinal axis, said second electrical distance being different from said first electrical distance, and
   wherein a difference between said first electrical distance and said second electrical distance is such that an antenna reflection signal resulting from reflection of said electromagnetic transmit signal by said horn antenna has a polarization being different from said second polarization.

2. The radar level gauge system according to claim 1, wherein said difference between said first electrical distance and said second electrical distance is such that said antenna reflection signal has said first polarization.

3. The radar level gauge system according to claim 1, wherein said first polarization and said second polarization are orthogonal polarizations.

4. The radar level gauge system according to claim 3, wherein said first polarization is a first circular polarization and said second polarization is a second circular polarization.

5. The radar level gauge system according to claim 1, wherein said conductive horn antenna wall further exhibits:
   said first electrical distance from said first opening to said second opening, along a third path defined by an intersection between said conductive horn antenna wall and a half-plane extending from said central longitudinal axis, said third path being located opposite said first path with respect to said central longitudinal axis; and
   said second electrical distance from said first opening to said second opening, along a fourth path defined by an intersection between said conductive horn antenna wall and a half-plane extending from said central longitudinal axis, said fourth path being located opposite said second path with respect to said central longitudinal axis.

6. The radar level gauge system according to claim 1, wherein said electrical distance as a function of said rotational orientation of said half-plane with respect to said central longitudinal axis exhibits:
- a first maximum and a second maximum located opposite each other with respect to said central longitudinal axis; and
- a first minimum and a second minimum located opposite each other with respect to said central longitudinal axis.

7. The radar level gauge system according to claim 6, wherein said first minimum is located half-way between said first maximum and said second maximum.

8. The radar level gauge system according to claim 6, wherein:
- the electrical distance for said first maximum is substantially the same as the electrical distance for said second maximum;
- the electrical distance for said first minimum is substantially the same as the electrical distance for said second minimum; and
- a difference in electrical distance for said first maximum and said first minimum is a quarter of a wavelength of said electromagnetic transmit signal.

9. The radar level gauge system according to claim 1, wherein said conductive horn antenna wall exhibits a first physical distance from said first opening to said second opening along said first path and a second physical distance from said first opening to said second opening along said second path, said second physical distance being different from said first physical distance.

10. The radar level gauge system according to claim 1, wherein said horn antenna comprises at least one aperture in said conductive horn antenna wall between said first opening and said second opening.

11. The radar level gauge system according to claim 10, wherein said at least one aperture is elongated in a direction perpendicular to said central longitudinal axis.

12. The radar level gauge system according to claim 10, wherein a length extension of said at least one aperture is approximately one half of a wavelength of said electromagnetic transmit signal.

13. The radar level gauge system according to claim 10, wherein said horn antenna comprises a first aperture in said conductive horn antenna wall between said first opening and said second opening arranged at a first angular position in relation to said central longitudinal axis, and a second aperture in said conductive horn antenna wall between said first opening and said second opening arranged at a second angular position in relation to said central longitudinal axis opening, spaced apart from said first angular position by approximately 180°.

14. A method of determining a filling level of a product in a tank, comprising the steps of:
- transmitting an electromagnetic transmit signal having a first polarization;
- propagating, using a horn antenna, said electromagnetic transmit signal towards said surface of the product;
- reflecting, by said horn antenna, an antenna reflection signal substantially only having said first polarization;
- receiving an electromagnetic surface reflection signal resulting from reflection of said electromagnetic transmit signal at said surface of the product, said electromagnetic reflection signal having a second polarization different from said first polarization; and
- determining said filling level based on said electromagnetic surface reflection signal.

15. The method according to claim 14, wherein said first and second polarizations are circular polarizations.

* * * * *